(12) United States Patent
Wang et al.

(10) Patent No.: US 9,609,607 B2
(45) Date of Patent: Mar. 28, 2017

(54) MAIN SYNCHRONIZATION SEQUENCE DESIGN METHOD FOR GLOBAL COVERING MULTI-BEAM SATELLITE LTE

(71) Applicant: Southeast University, Nanjing (CN)

(72) Inventors: Haiming Wang, Nanjing (CN); Zhuming Deng, Nanjing (CN); Xiqi Gao, Nanjing (CN); Xiaohu You, Nanjing (CN)

(73) Assignee: Southeast University, Nanjing, Jiangsu (CN)

( * ) Notice: Subject to any disclaimer, the term of this patent is extended or adjusted under 35 U.S.C. 154(b) by 0 days.

(21) Appl. No.: 14/780,096

(22) PCT Filed: Jun. 20, 2013

(86) PCT No.: PCT/CN2013/077552
§ 371 (c)(1),
(2) Date: Jan. 11, 2016

(87) PCT Pub. No.: WO2014/166163
PCT Pub. Date: Oct. 16, 2014

(65) Prior Publication Data
US 2016/0112973 A1    Apr. 21, 2016

(30) Foreign Application Priority Data
Apr. 8, 2013 (CN) .......................... 2013 1 0119936

(51) Int. Cl.
*H04W 48/08* (2009.01)
*H04W 56/00* (2009.01)
(Continued)

(52) U.S. Cl.
CPC ....... *H04W 56/001* (2013.01); *H04J 13/0062* (2013.01); *H04L 27/2655* (2013.01); *H04L 27/2692* (2013.01); *H04W 84/06* (2013.01)

(58) Field of Classification Search
CPC . H04W 56/001; H04W 84/06; H04J 13/0062; H04L 27/2655; H04L 27/2692
See application file for complete search history.

(56) References Cited

U.S. PATENT DOCUMENTS 7,746,916 B2 *  6/2010  Han ................. H04J 13/10
                                                    370/203
2007/0183386 A1  8/2007  Muharemovic et al.
(Continued)

FOREIGN PATENT DOCUMENTS

CN         102271015 A    7/2011

OTHER PUBLICATIONS

Long Term Evolution by Borko Furht and Syed A. Ahson (ISBN 978-1-4200-7210-5), 2009. Text can be found at: https://books.google.com/books?id=eUISAI5F7z4C&pg=PA471&lpg=PA471&lpg=Long+Term+Evolution+Borko+Furht&source=bl&ots=33Ww2-c4Fd&sig=gy5oG-nH87TxPze2puSHJ6nMz1A&hl=en&sa=X&ved=0CCsQ6AEwAWoVChMlk6idsvv5xwlVwhk-Ch1h1gRa#v=onepage&q=Long%20Term%20Evolution%20Borko%20Furht&f=false.
(Continued)

*Primary Examiner* — Dac Ha
(74) *Attorney, Agent, or Firm* — Miller Law Group, PLLC (57) ABSTRACT

Disclosed is a main synchronization sequence design method for global covering multi-beam satellite LTE, comprising the follow steps: extending a standard Zadoff-Chu sequence to a generalized Zadoff-Chu sequence so as to obtain an initial candidate main synchronization sequence set of more candidate sequences; gradually narrowing down the candidate main synchronization sequence set according to a selection standard of a main synchronization sequence to obtain a final candidate main synchronization sequence
(Continued)

set; and obtaining a main synchronization sequence set with optimal eclectic performance and complexity from the final candidate main synchronization sequence set. According to the present invention, a main synchronization sequence with optimal eclectic performance and calculation complexity can be designed for a global covering same-frequency networking multi-beam satellite LTE system.

18 Claims, 4 Drawing Sheets

(51) Int. Cl.
*H04J 13/00* (2011.01)
*H04L 27/26* (2006.01)
*H04W 84/06* (2009.01)

(56) References Cited

U.S. PATENT DOCUMENTS

| | | | | |
|---|---|---|---|---|
| 2009/0202029 A1* | 8/2009 | Nazar | ............ | H04J 11/0073 375/362 |
| 2011/0007627 A1* | 1/2011 | Lee | ............ | H04L 5/0048 370/210 |
| 2011/0249548 A1* | 10/2011 | Gaal | ............ | H04J 13/0059 370/206 |

OTHER PUBLICATIONS

3GPP "Evolved Universal Terrestrial Radio Access (E-UTRA); Physical Channels and Modulation (Release 11)", 3GPP TS 36.211 V11.2.0.2 (Feb. 2013). Information can be found at: http://www.3gpp.org/dynareport/36211.htm.

* cited by examiner

MAIN SYNCHRONIZATION SEQUENCE DESIGN METHOD FOR GLOBAL COVERING MULTI-BEAM SATELLITE LTE

FIELD OF THE INVENTION

The present invention belongs to wideband wireless communication field, and particularly relates to a main synchronization sequence design method for global covering multi-beam satellite LTE.

BACKGROUND OF THE INVENTION

Satellite mobile communication is one of the necessary means for communication anywhere. In recent years, the fourth generation (4G) terrestrial cellular mobile communication became matured gradually, and the 3rd Generation Partnership Project Long Term Evolution (3GPP-LTE), which is based on key techniques such as Orthogonal Frequency Division Multiplexing (OFDM), Multiple-Input Multiple-Output (MIMO), and same-frequency networking, etc., has been commercially available gradually. How to apply Terrestrial LTE (T-LTE) that has characteristics such as high speed, high capacity, high spectrum efficiency, and high power efficiency, etc. in satellite mobile communication to establish multi-beam Satellite LTE (S-LTE) mobile communication systems based on same-frequency networking technique is a hotspot and a challenge in the current research in satellite mobile communication field.

Providing mobile communication services with Geostationary Earth Orbit (GEO) satellites has many advantages: theoretically, a single GEO satellite can cover 42.2% earth surface, and 3 GEO satellites can cover the global regions except for the south and north poles; the signal transmission delay is a constant; frequent inter-satellite switchover is unnecessary; the Doppler shift is small; the technology is matured relatively, and the investment risk is lower, etc. However, a satellite mobile communication system that solely employs GEO satellites has some problems: (1) the GEO satellites have been occupied densely; (2) the south and north poles can't be covered; (3) the signal transmission distance is longer in middle and high latitude regions, since the communication elevation angle thereof is low; (4) high constructions and mountains, etc. between the ground terminal and the satellite hinder the signal transmission, and thus cause shadow regions, so that it is difficult to realize global coverage of satellite mobile communication. For Inclining Geostationary Synchronized Orbit (IGSO) satellites, the sub-satellite track is in a "8" shape with the equator as the symmetry axis, since the orbit inclination angle is greater than 0°; the larger the orbit inclination angle is, the larger the "8"-shaped region is. Therefore, IGSO satellites can effectively overcome one drawback of GEO satellites that the elevation angle in middle and high latitude regions is always low. However, the covering capacity of an IGSO satellite is inferior to that of a GEO satellite. When GEO satellites and IGSO satellites are utilized in combination to complement each other in a network, global covering can be realized.

A multi-beam GEO-IGSO S-LTE mobile communication system employs a large-size antenna array on the satellite to produce multiple beams, which form multiple cells when they reach the ground surface. Similar to T-LTE, GEO-IGSO S-LTE also employs same-frequency networking pattern, in which different main synchronization sequences are configured for adjacent cells. However, GEO-IGSO S-LTE has severe Inter-Beam Interference (IBI), and the overlap range between adjacent cells is large. To implement better cell searching, more main synchronization sequences are required for GEO-IGSO S-LTE.

SUMMARY OF THE INVENTION

Object of the Invention: In view that multi-beam GEO-IGSO S-LTE requires more main synchronization sequences than T-LTE, the object of the present invention is to provide a main synchronization sequence design method for global covering multi-beam satellite LTE.

Technical scheme: To attain the object described above, the present invention employs the following technical scheme: a main synchronization sequence design method for global covering multi-beam satellite LTE, comprising the following steps:

(1) extending a standard Zadoff-Chu sequence into a generalized Zadoff-Chu sequence, so as to obtain more sets of initial candidate main synchronization sequences of candidate sequences;

(2) reducing the sets of candidate main synchronization sequences gradually according to the selection criteria for main synchronization sequences, to obtain a final set of candidate main synchronization sequences;

(3) obtaining a set of main synchronization sequences that has the best trade-off between performance and complexity from the final set of candidate main synchronization sequences.

Furthermore, the step (1) comprises the following steps:

(1) extending a standard Zadoff-Chu sequence in length $N_{zc}$ into a generalized Zadoff-Chu sequence by sub-carrier mapping, to obtain a set of generalized Zadoff-Chu sequences $A=\{x_u|u=1, 2, \ldots, N_{zc}\}$, where, $x_u$ is the vector form of generalized Zadoff-Chu sequence $x_u(m)$, and u represents root index;

(2) removing the middle point from each sequence in the set of generalized Zadoff-Chu sequences A, to obtain an set of initial candidate main synchronization sequences, i.e. $B=\{d_u|u=1, 2, \ldots, N_{zc}\}$, where, $d_u$ is the vector form of initial candidate main synchronization sequence $d_u(k)$, and the length of vector $d_u$ is $N_{zc}-1$.

The generalized Zadoff-Chu sequence $x_u(m)$ is obtained from the following expression:

$$x_u(m) = \exp\left(-\frac{j\pi u m(m+1)}{N_{zc}}\right)$$

$$m = 0, 1, \ldots, N_{zc} - 1$$

where, j is imaginary unit;

$$d_u(k) = \begin{cases} \exp\left(-\frac{j\pi u k(k+1)}{N_{zc}}\right) & k = 0, 1, \ldots, \frac{N_{zc}-3}{2} \\ \exp\left(-\frac{j\pi u (k+1)(k+2)}{N_{zc}}\right) & k = \frac{N_{zc}-1}{2}, \frac{N_{zc}+1}{2}, \ldots, N_{zc}-2 \end{cases}$$

Furthermore, the selection criteria include: time domain autocorrelation characteristic, peak-to-average ratio of time domain signal, frequency offset susceptibility, time domain cross-correlation characteristic, and computing complexity in the correlation computation of main synchronization sequences on the receiving terminal.

In the step (2), a time domain sequence $s_u(n)$ is obtained by carrying out zero padding and N-point inverse discrete Fourier transform for the sequences in the sets of initial candidate main synchronization sequences:

$$s_u(n) = \frac{1}{\sqrt{N_{zc}-1}} \sum_{k=0}^{N-1} \hat{d}_u(k) \exp\left(\frac{j2\pi kn}{N}\right),$$

$n = 0, 1, \ldots, N-1$ where, $$\hat{d}_u(k) = \begin{cases} d_u\left(k + \frac{N_{zc}-1}{2} - 1\right) & k = 1, 2, \ldots, \frac{N}{2}-1 \\ d_u\left(k - N + \frac{N_{zc}-1}{2}\right) & k = \frac{N}{2}+1, \frac{N}{2}+2, \ldots, N-1 \\ 0 & k = 0, \frac{N}{2} \end{cases}$$

computing the time domain autocorrelation characteristic of the sequences in the sets of initial candidate main synchronization sequences as follows:

$$P_u = 10 \log_{10}\left(\frac{\max_{\substack{1-N \leq \tilde{n} \leq N-1 \\ \tilde{n} \neq 0}} \{R_u(\tilde{n})\}}{R_u(0)}\right) \text{ (dB)}$$

where, $$R_u(\tilde{n}) = \left|\sum_{n=0}^{N-1} s_u(n) s_u^*((n+\tilde{n}) \bmod N)\right|,$$

$P_u$ is used to describe the time domain autocorrelation characteristic of a sequence, $R_u(\tilde{n})$ is the time domain autocorrelation value of a sequence, * represents conjugation, $\tilde{n}$ is the cyclic shift offset of sequence $s_u(n)$, and $1-N \leq \tilde{n} \leq N-1$;

setting a threshold for the time domain autocorrelation characteristic, and removing the sequences with computed time domain autocorrelation characteristic $P_u$ greater than the threshold, to obtain a first set of candidate main synchronization sequences;

computing the peak-to-average ratio of time domain signal of the sequences in the first set of candidate main synchronization sequences:

$$PAPR\{s_u\} = 10 \log_{10}\left(\frac{\max_{0 \leq n \leq N-1} \{|s_u(n)|^2\}}{E\{|s_u(n)|^2\}}\right) \text{ (dB)}$$

where, $PAPR\{s_u\}$ is used to describe the peak-to-average ratio of time domain signal of a sequence, $s_u$ is the vector form of time domain sequence $s_u(n)$, $E\{\cdot\}$ represents statistical average, $\max\{\cdot\}$ represents selecting the maximum value;

setting a threshold for the peak-to-average ratio of time domain signal, and removing the sequences with computed peak-to-average ratio of time domain signal $PAPR\{s_u\}$ greater than the threshold, to obtain a second set of candidate main synchronization sequences;

computing the frequency offset susceptibility of the sequences in the second set of candidate main synchronization sequences:

$$FoS\{s_u\} = 10 \log_{10}\left(\frac{\max_{\substack{1-N \leq \tilde{n} \leq N-1 \\ \tilde{n} \neq 0}} \{\tilde{R}_u(\tilde{n})\}}{\tilde{R}_u(0)}\right) \text{ (dB)}$$

where, $$\tilde{R}_u(\tilde{n}) = \left|\sum_{n=0}^{N-1} s_u(n) s_u^*((n+\tilde{n}) \bmod N) \exp\left(\frac{j2\pi n\varepsilon}{N}\right)\right|,$$

$FoS\{s_u\}$ is used to describe the frequency offset susceptibility of a sequence, $\tilde{R}_u(\tilde{n})$ is the time domain autocorrelation value of a sequence after adding a carrier frequency offset, and $\varepsilon$ is a normalized carrier frequency offset;

setting a threshold for the frequency offset susceptibility, and removing the sequences with computed frequency offset susceptibility $FoS\{s_u\}$ greater than the threshold, to obtain a third set of candidate main synchronization sequences;

computing the time domain cross-correlation characteristic of the sequences in the third set of candidate main synchronization sequences:

$$P_{u_1 u_2} = 10 \log_{10}\left(\frac{\max_{1-N \leq \tilde{n} \leq N-1} \{R_{u_1 u_2}(\tilde{n})\}}{R_{u_1 u_1}(0)}\right) \text{ (dB)}$$

where, $$R_{u_1 u_2}(\tilde{n}) = \left|\sum_{n=0}^{N-1} s_{u_1}(n) s_{u_2}^*((n+\tilde{n}) \bmod N)\right|,$$

$P_{u_1 u_2}$ is used to describe the time domain cross-correlation characteristic between sequences, $u_1$ and $u_2$ represent different root indexes respectively, and $R_{u_1 u_2}(\tilde{n})$ is the time domain cross-correlation value between sequences;

setting a threshold for the time domain cross-correlation characteristic, and removing the sequence pairs with computed time domain cross-correlation characteristic $P_{u_1 u_2}$ greater than the threshold, to obtain a fourth set of candidate main synchronization sequences;

applying the criteria for computing complexity in correlation computation to the fourth set of candidate main synchronization sequences on the receiving terminal, and utilizing a general sequence property $s_u(n) = s^*_{N_{zc}-u}(n)$, so that the correlation result of the other sequence can be obtained directly without any additional multiply operation once the receiving terminal obtains the correlation result of one sequence. Thus, a final set of candidate main synchronization sequences is obtained.

Beneficial effects: firstly, global coverage is realized by using GEO satellite and IGSO satellite in combination in a same-frequency network; secondly, with the technical scheme of the present invention, two different sets of main synchronization sequences are provided for GEO satellite and IGSO satellite respectively, so that the interference between cells is reduced compared with cells configured with the same main synchronization sequence, the timing precision is improved, and the cell searching speed is improved; thirdly, with the technical scheme of the present invention, since two different sets of main synchronization sequences are provided for GEO satellite and IGSO satellite, the type of satellite to which a cell belongs can be judged by detecting the main synchronization sequence; fourthly, with the technical scheme of the present invention, multiple main synchronization sequences designed for GEO satellite and IGSO satellite can be two subsets of sequences that are conjugated to each other, and thereby the correlation computation load on the receiving terminal can be reduced.

DETAILED DESCRIPTION OF THE PREFERRED EMBODIMENTS

Hereunder the present invention will be further detailed in embodiments, with reference to the accompanying drawings. It should be appreciated that these embodiments are provided only for describing the present invention, and shall not be deemed as constituting any limitation to the scope of the present invention. Those skilled in the art can make various equivalent modifications to the present invention without departing from the spirit of the present invention, but all these modifications shall be deemed as falling into the protected domain as confined by the attached claims.

Figure 1:
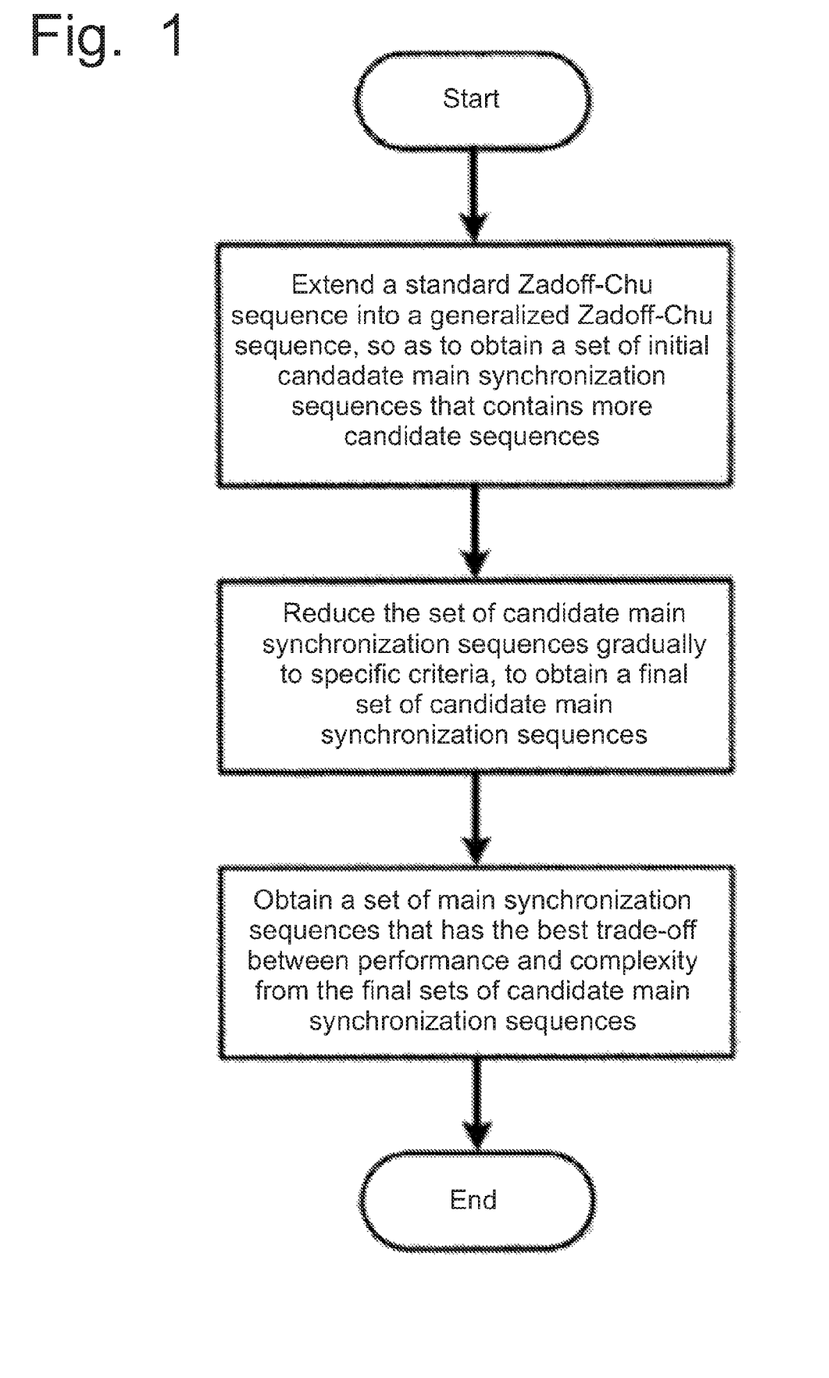
FIG. 1 is a flow chart of the main synchronization sequence design method for global covering multi-beam S-LTE disclosed in the present invention.

The present invention provides a main synchronization sequence design method for global covering multi-beam S-LTE. FIG. 1 is a flow chart of the method. Hereunder the embodiments of the present invention will be further detailed exemplarily in the case of a standard Zadoff-Chu sequence with sequence length $N_{zc}$=63, with reference to the accompanying drawings.

(1) According to the definition of a standard Zadoff-Chu sequence, $N_{zc}$ and root index u must meet:

$$gcd(N_{zc}, u) = 1 \quad \text{(expression 1)}$$

where, gcd(x,y) represents the greatest common divisor of x and y. The LTE technical specification specifies that the middle element in the main synchronization sequence corresponding to the DC sub-carrier must be set to zero; thus, a standard Zadoff-Chu sequence can be extended to a generalized Zadoff-Chu sequence, i.e., the value of root index u can be u ∈ {1,2, ..., $N_{zc}$}. In that way, more sets of initial candidate main synchronization sequences of candidate sequences can be obtained.

1) Extend a standard Zadoff-Chu sequence into a generalized Zadoff-Chu sequence, to obtain a set of generalized Zadoff-Chu sequences A={$x_u$|u=1,2, ..., $N_{zc}$}, where, $x_u$ is the vector form of sequence $x_u(m)$, and $x_u(m)$ is obtained from the following expression:

$$x_u(m) = \exp\left(-\frac{j\pi u m(m+1)}{N_{zc}}\right) \quad \text{(expression 2)}$$

$$m = 0, 1, \ldots, N_{zc} - 1$$

2) Remove the middle point from each sequence in the set of generalized Zadoff-Chu sequences A, to obtain a set of initial candidate main synchronization sequences B={$d_u$|u=1,2, ..., $N_{zc}$}, where, $d_u$ is the vector form of sequence $d_u(k)$, and $d_u(k)$ is obtained from the following expression:

$$d_u(k) = \begin{cases} \exp\left(-\dfrac{j\pi u k(k+1)}{N_{zc}}\right) & k = 0, 1, \ldots, \dfrac{N_{zc}-3}{2} \\ \exp\left(-\dfrac{j\pi u(k+1)(k+2)}{N_{zc}}\right) & k = \dfrac{N_{zc}-1}{2}, \\ & \dfrac{N_{zc}+1}{2}, \ldots, N_{zc}-2 \end{cases} \quad \text{(expression 3)}$$

(2) Reduce the sets of candidate main synchronization sequences gradually according to the selection criteria for main synchronization sequences, i.e., time domain autocorrelation characteristic, peak-to-average ratio of time domain signal, frequency offset susceptibility, time domain cross-correlation characteristic, computing complexity in correlation computation of main synchronization sequences on the receiving terminal, to obtain a final set of candidate main synchronization sequences;

1) Carry out zero padding and IDFT transform with N=64 (i.e., the sampling rate is 0.96 MHz) for the sequences in the set of initial candidate main synchronization sequences B according to the mapping pattern of T-LTE main synchronization sequence in the frequency domain, to obtain a time domain sequence set S={$s_u$|u=1,2, ..., $N_{zc}$}, where, $s_u$ is the vector form of time domain sequence $s_u(n)$, and $s_u(n)$ is obtained from the following expression:

$$s_u(n) = \frac{1}{\sqrt{N_{zc}-1}} \sum_{k=0}^{N-1} \hat{d}_u(k) \exp\left\{\frac{j2\pi k n}{N}\right\}, \quad \text{(expression 4)}$$

$$n = 0, 1, \ldots, N-1$$

where, $$\hat{d}_u(k) = \quad \text{(expression 5)}$$

$$\begin{cases} d_u\left(k + \dfrac{N_{zc}-1}{2} - 1\right) & k = 1, 2, \ldots, \dfrac{N}{2} - 1 \\ d_u\left(k - N + \dfrac{N_{zc}-1}{2}\right) & k = \dfrac{N}{2}+1, \dfrac{N}{2}+2, \ldots, N-1 \\ 0 & k = 0, \dfrac{N}{2} \end{cases}$$

Figure 2:
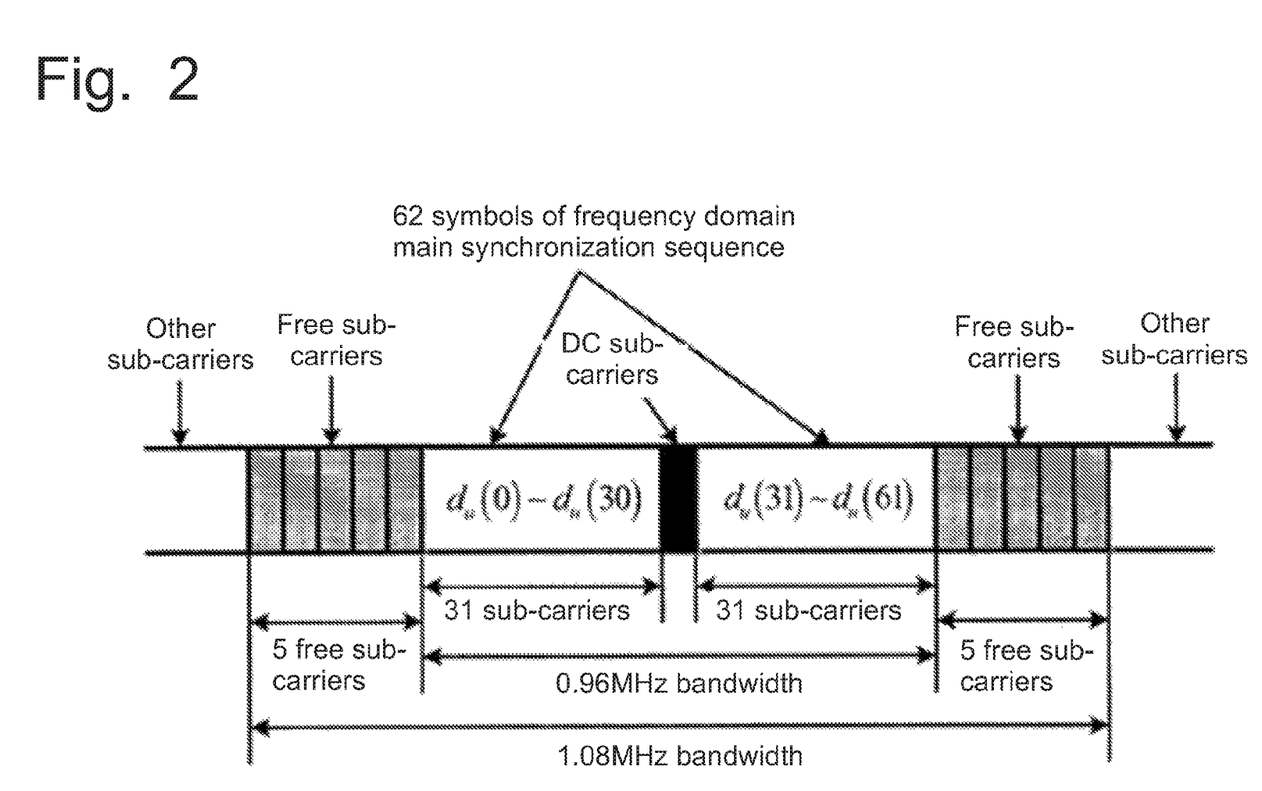
FIG. 2 illustrates the mapping pattern of a T-LTE main synchronization sequence in the frequency domain.

FIG. 2 illustrates the mapping pattern of a T-LTE main synchronization sequence in the frequency domain.

2) Compute the time domain autocorrelation characteristic $P_u$ of the sequences in the set of initial candidate main synchronization sequences, with the following expression:

$$P_u = 10 \log_{10}\left(\frac{\max\limits_{\substack{1-N \leq \tilde{n} \leq N-1 \\ \tilde{n} \neq 0}} \{R_u(\tilde{n})\}}{R_u(0)}\right) \quad \text{(expression 6)}$$

where,

-continued $$R_u(\tilde{n}) = \left|\sum_{n=0}^{N-1} s_u(n)s_u^*((n+\tilde{n})\bmod N)\right| \quad \text{(expression 7)}$$

Figure 3:
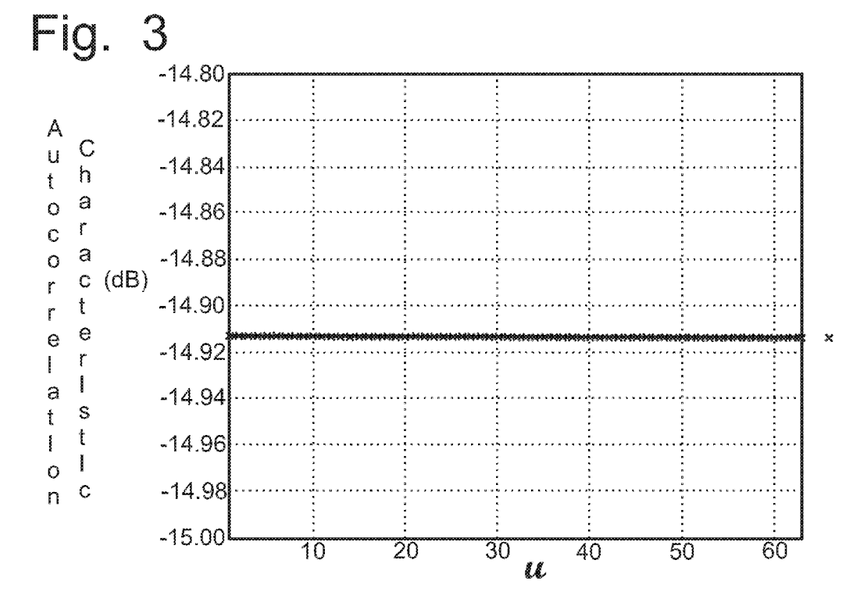
FIG. 3 illustrates the time domain autocorrelation characteristic of the first set of candidate main synchronization sequences.

Set the threshold for the time domain autocorrelation characteristic as −14.9 dB, and removing the sequences with computed time domain autocorrelation characteristic greater than the threshold, to obtain a first set of candidate main synchronization sequences C={$d_u$|u=1,2, ..., $N_{zc}$−1}. FIG. 3 illustrates the time domain autocorrelation characteristic of the first set of initial candidate main synchronization sequences.

3) Compute the peak-to-average ratio of time domain signal for the sequences in the first set of candidate main synchronization sequences obtained in step 2), with the following expression:

$$PAPR\{s_u\} = 10\log_{10}\left(\frac{\max_{0\le n\le N-1}\{|s_u(n)|^2\}}{E\{|s_u(n)|^2\}}\right) \text{ (dB)} \quad \text{(expression 8)}$$

where, $s_u$ is the vector form of time domain sequence $s_u(n)$, and $E\{\bullet\}$ represents statistical average. Set the threshold for peak-to-average ratio of time domain signal as 5.5 dB, and remove the sequences with computed peak-to-average ratio of time domain signal greater than the threshold, to obtain a second set of candidate main synchronization sequences:

$$D = \left\{d_u \middle| \begin{array}{l} u = 1,2,3,4,5,8,10,11,12,13,15,16,19,23,25,\\ 26,29,30,31,32,33,34,37,38,40,44,47,\\ 48,50,51,52,53,55,58,59,60,61,62 \end{array}\right\}$$

Figure 4:
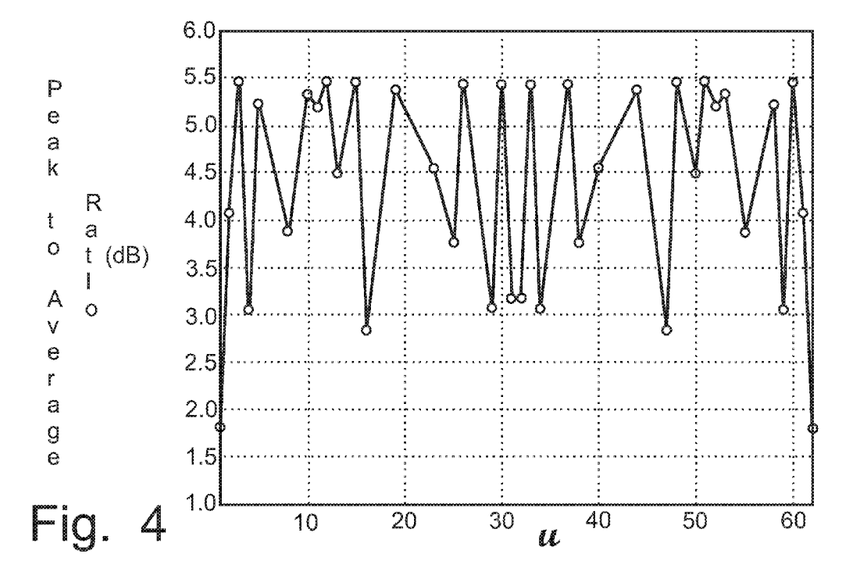
FIG. 4 illustrates the peak-to-average ratio of time domain signal of the second set of candidate main synchronization sequences.

FIG. 4 illustrates the peak-to-average ratio of time domain signal of the second set of candidate main synchronization sequences.

4) Compute the frequency offset susceptibility of the sequences in the second set of candidate main synchronization sequences obtained in step 3) with the following expression, where, the normalized carrier frequency offset (abbreviated as "normalized frequency offset") is set as $\epsilon$=0.3:

$$FoS\{s_u\} = 10\log_{10}\left(\frac{\max_{\substack{1-N\le\tilde{d}\le N-1\\ \tilde{n}\ne 0}}\{\tilde{R}_u(\tilde{n})\}}{\tilde{R}_u(0)}\right) \quad \text{(expression 9)}$$

where, $$\tilde{R}_u(\tilde{n}) = \left|\sum_{n=0}^{N-1} s_u(n)s_u^*((n+\tilde{n})\bmod N)\exp\left(\frac{j2\pi n\varepsilon}{N}\right)\right| \quad \text{(expression 10)}$$

Set the threshold for frequency offset susceptibility as −4.6 dB, and remove the sequences with frequency offset susceptibility greater than the threshold, to obtain a third set of candidate main synchronization sequences:

$$F=\{d_u|u=19,25,26,29,30,33,34,38,44\}$$

Figure 5:
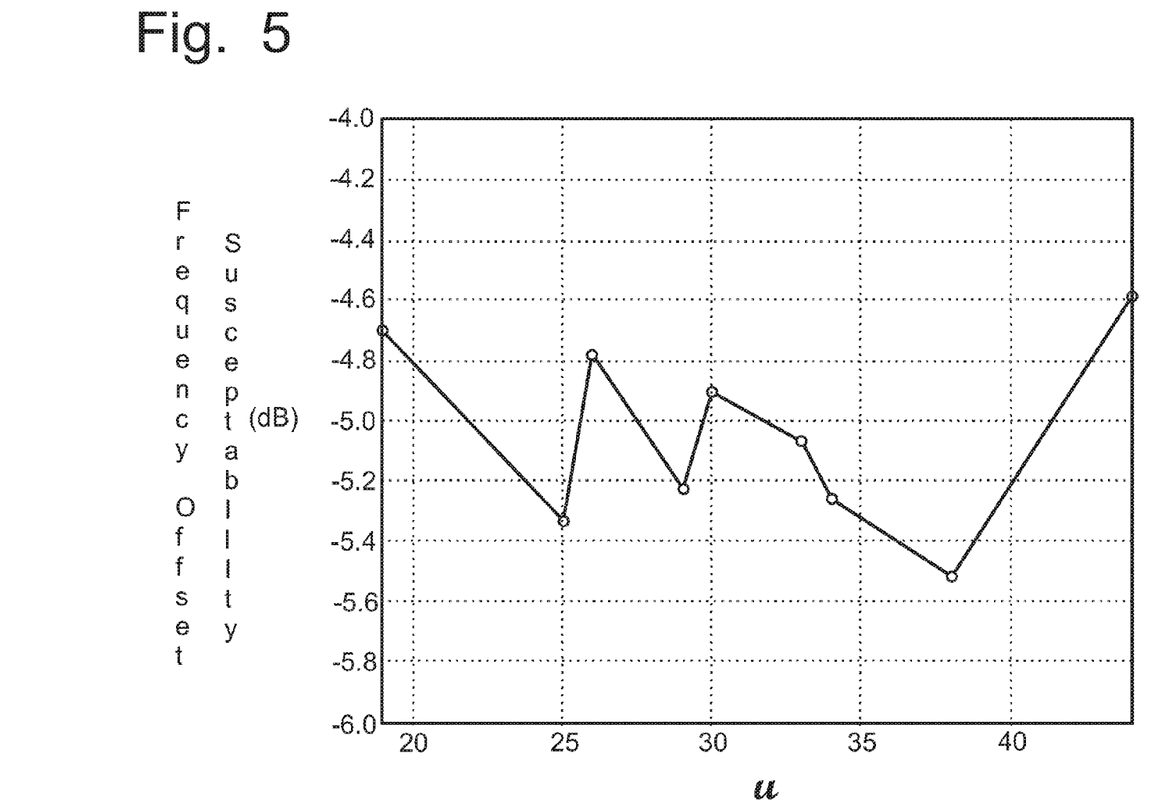
FIG. 5 illustrates the frequency offset susceptibility of the third set of candidate main synchronization sequences when the normalized frequency offset is 0.3.

FIG. 5 shows the frequency offset susceptibility of the third set of candidate main synchronization sequences when the normalized frequency offset is set as $\epsilon$=0.3.

5) Compute the time domain cross-correlation characteristic $P_{u_1 u_2}$ between every two sequences in the third set of candidate main synchronization sequences obtained in step 4), with the following expression:

$$P_{u_1 u_2} = 10\log_{10}\left(\frac{\max_{1-N\le\tilde{n}\le N-1}\{R_{u_1 u_2}(\tilde{n})\}}{R_{u_1 u_1}(0)}\right) \text{ (dB)} \quad \text{(expression 11)}$$

where:

$$R_{u_1 u_2}(\tilde{n}) = \left|\sum_{n=0}^{N-1} s_{u_1}(n)s_{u_2}^*((n+\tilde{n})\bmod N)\right| \quad \text{(expression 12)}$$

Thus, table 1 is obtained.

TABLE 1

Absolute Value of Maximum Cross-Correlation between Sequences (dB)
Cross-Correlation( dB)

| | u2 | | | | | | | | |
|---|---|---|---|---|---|---|---|---|---|
| u1 | 19 | 25 | 26 | 29 | 30 | 33 | 34 | 38 | 44 |
| 19 | 0 | −6.19 | −4.68 | −6.30 | −6.37 | −4.82 | −6.24 | −6.28 | −7.07 |
| 25 | −6.19 | 0 | −8.06 | −7.43 | −6.35 | −7.02 | −4.15 | −6.71 | −6.28 |
| 26 | −4.68 | −8.06 | 0 | −6.24 | −7.43 | −4.68 | −7.02 | −6.24 | −4.15 |
| 29 | −6.30 | −7.43 | −6.24 | 0 | −8.06 | −7.43 | −6.35 | −4.15 | −6.24 |
| 30 | −6.37 | −6.35 | −7.43 | −8.06 | 0 | −6.24 | −7.43 | −7.02 | −4.82 |
| 33 | −4.82 | −7.02 | −4.68 | −7.43 | −6.24 | 0 | −8.06 | −6.35 | −6.37 |
| 34 | −6.24 | −4.15 | −7.02 | −6.35 | −7.43 | −8.06 | 0 | −7.43 | −6.30 |
| 38 | −6.28 | −6.71 | −6.24 | −4.15 | −7.02 | −6.35 | −7.43 | 0 | −6.19 |
| 44 | −7.07 | −6.28 | −4.15 | −6.24 | −4.82 | −6.37 | −6.30 | −6.19 | 0 |

If the threshold for time domain cross-correlation characteristic is set as −6 dB, a fourth set of candidate main synchronization sequences can be obtained by removing the sequence pairs with time domain cross-correlation characteristic greater than the threshold:

$$G=\{d_u|u=19,25,26,29,30,33,34,38,44\}$$

6) Under the principle of minimum complexity in correlation computation of the main synchronization sequences on the receiving terminal, utilize the following Property:

$$s_u(n)=s^*_{N_{zc}-u}(n) \quad \text{(expression 13)}$$

Set $x=x_R+jx_I$, $y=y_R+jy_I$, where, $x_R$ and $x_I$ are the real part and imaginary part of vector x respectively, and $y_R$ and $y_I$ are the real part and imaginary part of vector y. Set $X_R=\text{Circ}\{x_R\}$, $X_I=\text{Circ}\{x_I\}$, where, $\text{Circ}\{x\}$ represent a cyclic matrix in which the first column is x; then, $X=\text{Circ}\{x\}=X_R+jX_I$, $X^*=\text{Circ}\{x^*\}=X_R-jX_I$. The cross-correlation between sequence x and sequence y can be expressed as:

$$r_{xy} = X^H y \quad \text{(expression 14)}$$
$$= (X_R + jX_I)^H (y_R + jy_I)$$
$$= (X_R^T y_R + X_I^T y_I) + j(X_R^T y_I - X_I^T y_R)$$
$$= (a+b) + j(c-d)$$

where, $a=X_R^T y_R$, $b=X_I^T y_I$, $c=X_R^T y_I$, $d=X_I^T y_R$. The cross-correlation between sequence x* and sequence y can be expressed as:

$$r_{x^*y} = (X^*)^H y \quad \text{(expression 15)}$$
$$= (X_R - jX_I)^H (y_R + jy_I)$$
$$= (X_R^T y_R - X_I^T y_I) + j(X_R^T y_I + X_I^T y_R)$$
$$= (a-b) + j(c+d)$$

Thus, utilizing the conjugation characteristic between the sequences, when the correlation result of one sequence is obtained by the receiving terminal, the correlation result of the other sequence can be obtained directly from the relationship between expression 14 and expression 15 without any additional multiplications. Hence the complexity in correlation computation of the main synchronization sequences on the receiving terminal can be reduced. According to that selection criterion, a final set of candidate main synchronization sequences is obtained:

$$H=\{d_u|u=(19,44),(25,38),(29,34),(30,33)\}$$

where, a set of 8 sequences is divided into 4 subsets, and the sequences in the sequence pair in each subset are conjugated to each other.

(3) Obtain a set of main synchronization sequences that has the best trade-off between performance and complexity of computation from the final set of candidate main synchronization sequences. To utilize the conjugation characteristic between the sequences to reduce the complexity in correlation computation, 3 sequences can be selected as main synchronization sequences for the GEO satellite, which are selected from any three sequence subsets of the final set of candidate main synchronization sequences H respectively (select one sequence from each of the three sequence subsets), while the IGSO satellite can select the remaining 3 sequences in the 3 subsets. For example, the GEO satellite employs a set of main synchronization sequences $H_{GEO} \not= \{d_u|u=25,29,30\}$, while the IGSO satellite employs a set of main synchronization sequences $H_{IGSO} \not= \{d_u|u=33,34,38\}$.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. The invention is not otherwise limited, except for the recitation of the claims set forth below.

The invention claimed is:

1. A system for designing a main synchronization sequence for utilization in a global covering multi-beam satellite LTE having a processor configured to define and generate candidate main synchronization sequences comprising:

said processor including a non-transitory computer-readable medium with a sequence of instructions to generate and provide said candidate main synchronization sequences for said multi-beam satellite LTE, through the following steps:

(1) extending a standard Zadoff-Chu sequence into a generalized Zadoff-Chu sequence, so as to obtain more sets of initial candidate main synchronization sequences of candidate sequences;

(2) reducing the sets of candidate main synchronization sequences according to a predetermined selection criteria for main synchronization sequences, to obtain a final set of candidate main synchronization sequences, obtaining a time domain sequence $s_u(n)$ by carrying out zero padding and N-point inverse discrete Fourier transform for the sequences in the set of initial candidate main synchronization sequences:

$$s_u(n) = \frac{1}{\sqrt{N_{zc}-1}} \sum_{k=0}^{N-1} \hat{d}_u(k) \exp\left(\frac{j2\pi kn}{N}\right),$$
$$n = 0, 1, \ldots, N-1$$

where, $$\hat{d}_u(k) = \begin{cases} d_u\left(k + \frac{N_{zc}-1}{2} - 1\right) & k=1,2,\ldots,\frac{N}{2}-1 \\ d_u\left(k - N + \frac{N_{zc}-1}{2}\right) & k=\frac{N}{2}+1, \frac{N}{2}+2, \ldots, N-1; \\ 0 & k=0, \frac{N}{2} \end{cases}$$

where, $N_{zc}$ is the sequence length and N is the number of time samples; and (3) obtaining a set of main synchronization sequences that represents a high level of performance while reducing complexity from the final set of candidate main synchronization sequences.

2. The system according to claim 1, wherein, the step (1) comprises the following steps:

1) extending a standard Zadoff-Chu sequence in length $N_{zc}$ into a generalized Zadoff-Chu sequence by subcarrier mapping, to obtain a set of generalized Zadoff-Chu sequences $A=\{x_u|u=1,2,\ldots,N_{zc}\}$, where, $x_u$ is the vector form of generalized Zadoff-Chu sequence $x_u(m)$, and u represents root index and m is the position of each root Zadoff-Chu sequence with m being greater than 0 and less than $N^{zc}$; and 2) removing the middle point from each sequence in the set of generalized Zadoff-Chu sequences A, to obtain a set of initial candidate main synchronization sequences $B=\{d_u|u=1,2,\ldots,N_{zc}\}$, where, $d_u$ is the vector form of initial candidate main synchronization sequence $d_u(k)$, and the length of vector $d_u$ is $N_{zc}-1$.

3. The system according to claim 2, wherein, the generalized Zadoff-Chu sequence $x_u(m)$ is obtained from the following expression:

$$x_u(m) = \exp\left(-\frac{j\pi u m(m+1)}{N_{zc}}\right)$$
$$m = 0, 1, \ldots, N_{zc} - 1$$

where, j is imaginary unit;

$$d_u(k) = \begin{cases} \exp\left(-\frac{j\pi u k(k+1)}{N_{zc}}\right) & k = 0, 1, \ldots, \frac{N_{zc}-3}{2} \\ \exp\left(-\frac{j\pi u(k+1)(k+2)}{N_{zc}}\right) & k = \frac{N_{zc}-1}{2}, \frac{N_{zc}+1}{2}, \ldots, N_{zc}-2 \end{cases}.$$

4. The system according to claim 3, wherein, the selection criteria include: time domain autocorrelation characteristic, peak-to-average ratio of time domain signal, frequency offset susceptibility, time domain cross-correlation characteristic, and computing complexity in the correlation computation of main synchronization sequences on the receiving terminal.

5. The system according to claim 4, wherein, the steps further comprising:
computing the time domain autocorrelation characteristic of the sequences in the set of initial candidate main synchronization sequences:

$$P_u = 10\log_{10}\left(\frac{\max\limits_{\substack{1-N \le \tilde{n} \le N-1 \\ \tilde{n} \ne 0}} \{R_u(\tilde{n})\}}{R_u(0)}\right) \text{(dB)}$$

where, $$R_u(\tilde{n}) = \left|\sum_{n=0}^{N-1} s_u(n)s_u^*((n+\tilde{n})\mathrm{mod}\, N)\right|,$$

$P_u$ is used to describe the time domain autocorrelation characteristic of a sequence, $R_u(\tilde{n})$ is the time domain autocorrelation value of a sequence, * represents conjugation, $\tilde{n}$ is the cyclic shift offset of sequence $s_u(n)$, and $1-N \le \tilde{n} \le N-1$; and
setting a threshold for the time domain autocorrelation characteristic, and removing the sequences with computed time domain autocorrelation characteristic $P_u$ greater than the threshold, to obtain a first set of candidate main synchronization sequences.

6. The system according to claim 5, wherein, the steps further comprising:
computing the peak-to-average ratio of time domain signal of the sequences in the first set of candidate main synchronization sequences:

$$PAPR\{s_u\} = 10\log_{10}\left(\frac{\max\limits_{0 \le n \le N-1}\{|s_u(n)|^2\}}{E\{|s_u(n)|^2\}}\right) \text{(dB)}$$

where, $PAPR\{s_u\}$ is used to describe the peak-to-average ratio of time domain signal of a sequence, $s_u$ is the vector form of time domain sequence $s_u(n)$, $E\{\cdot\}$ represents statistical average, max $\{\cdot\}$ represents selecting the maximum value; and
setting a threshold for the peak-to-average ratio of time domain signal, and removing the sequences with computed peak-to-average ratio of time domain signal $PAPR\{s_u\}$ greater than the threshold, to obtain a second set of candidate main synchronization sequences.

7. The system according to claim 6, wherein, the steps further comprising:
computing the frequency offset susceptibility of the sequences in the second set of candidate main synchronization sequences:

$$FoS\{s_u\} = 10\log_{10}\left(\frac{\max\limits_{\substack{1-N \le \tilde{n} \le N-1 \\ \tilde{n} \ne 0}} \{\tilde{R}_u(\tilde{n})\}}{\tilde{R}_u(0)}\right) \text{(dB)}$$

where, $$\tilde{R}_u(\tilde{n}) = \left|\sum_{n=0}^{N-1} s_u(n)s_u^*((n+\tilde{n})\mathrm{mod}\, N)\exp\left(\frac{j2\pi n\varepsilon}{N}\right)\right|,$$

$FoS\{s_u\}$ is used to describe the frequency offset susceptibility of a sequence, $\tilde{R}_u(\tilde{n})$ is the time domain autocorrelation value of a sequence after adding a carrier frequency offset, and $\varepsilon$ is a normalized carrier frequency offset; and
setting a threshold for the frequency offset susceptibility, and removing the sequences with computed frequency offset susceptibility $FoS\{s_u\}$ greater than the threshold, to obtain a third set of candidate main synchronization sequences.

8. The system according to claim 7, wherein, the steps further comprising:
computing the time domain cross-correlation characteristic of the sequences in the third set of candidate main synchronization sequences:

$$P_{u_1 u_2} = 10\log_{10}\left(\frac{\max\limits_{1-N \le \tilde{n} \le N-1} \{R_{u_1 u_2}(\tilde{n})\}}{R_{u_1 u_1}(0)}\right) \text{(dB)}$$

where, $$R_{u_1 u_2}(\tilde{n}) = \left|\sum_{n=0}^{N-1} s_{u_1}(n)s_{u_2}^*((n+\tilde{n})\mathrm{mod}\, N)\right|,$$

$P_{u_1 u_2}$ is used to describe the time domain cross-correlation characteristic between sequences, $u_1$ and $u_2$ represent different root indexes respectively, each root index having a domain greater than 0, and $R_{u_1 u_2}(\tilde{n})$ is the time domain cross-correlation value between sequences; and
setting a threshold for the time domain cross-correlation characteristic, and removing the sequence pairs with computed time domain cross-correlation characteristic $P_{u_1 u_2}$ greater than the threshold, to obtain a fourth set of candidate main synchronization sequences.

9. The system according to claim 8, wherein, the steps further comprising:

applying the criteria for complexity in correlation computation to the fourth set of main synchronization sequences on the receiving terminal and utilizing a sequence property $s_u(n)=s^*_{N_{zc}-u}(n)$ to obtain a final set of candidate main synchronization sequences.

10. The system of claim 7, wherein, the process further comprises:

computing the time domain cross-correlation characteristic of the sequences in the third set of candidate main synchronization sequences:

$$P_{u_1 u_2} = 10 \log_{10}\left(\frac{\max_{1-N \leq \tilde{n} \leq N-1}\{R_{u_1 u_2}(\tilde{n})\}}{R_{u_1 u_1}(0)}\right) \text{ (dB)}$$

where, $$R_{u_1 u_2}(\tilde{n}) = \left|\sum_{n=0}^{N-1} s_{u_1}(n) s^*_{u_2}((n+\tilde{n}) \bmod N)\right|,$$

$P_{u_1 u_2}$ is used to describe the time domain cross-correlation characteristic between sequences, $u_1$ and $u_2$ represent different root indexes respectively, each root index having a domain greater than 0, and $R_{u_1 u_2}(\tilde{n})$ is the time domain cross-correlation value between sequences; and setting a threshold for the time domain cross-correlation characteristic, and removing the sequence pairs with computed time domain cross-correlation characteristic $P_{u_1 u_2}$ greater than the threshold, to obtain a fourth set of candidate main synchronization sequences.

11. The system of claim 10, wherein, the process further comprises:

applying the criteria for complexity in correlation computation to the fourth set of main synchronization sequences on the receiving terminal and utilizing a sequence property $s_u(n)=s^*_{N_{zc}-u}(n)$ to obtain a final set of candidate main synchronization sequences.

12. A system for designing a main synchronization sequence for a global covering multi-beam satellite LTE having a processor configured to define and generate candidate main synchronization sequences, comprising:

a non-transitory computer-readable medium with a sequence of instructions which, when executed by the processor, causes said processor to operate a process to generate and provide candidate main synchronization sequences for a multi-beam satellite LTE, said process comprising:

extending a standard Zadoff-Chu sequence into a generalized Zadoff-Chu sequence, so as to obtain more sets of initial candidate main synchronization sequences of candidate sequences;

reducing the sets of candidate main synchronization sequences according to a predetermined selection criteria for main synchronization sequences, to obtain a final set of candidate main synchronization sequences, obtaining a time domain sequence $s_u(n)$ by carrying out zero padding and N-point inverse discrete Fourier transform for the sequences in the set of initial candidate main synchronization sequences:

$$s_u(n) = \frac{1}{\sqrt{N_{zc}-1}} \sum_{k=0}^{N-1} \hat{d}_u(k) \exp\left(\frac{j2\pi kn}{N}\right), n = 0, 1, \ldots, N-1$$

where, $$\hat{d}_u(k) = \begin{cases} d_u\left(k + \frac{N_{zc}-1}{2} - 1\right) & k = 1, 2, \ldots, \frac{N}{2}-1 \\ d_u\left(k - N + \frac{N_{zc}-1}{2}\right) & k = \frac{N}{2}+1, \frac{N}{2}+2, \ldots, N-1 \\ 0 & k = 0, \frac{N}{2} \end{cases}$$

where, $N_{zc}$ is the sequence length and N is the number of time samples; and obtaining a set of main synchronization sequences that represents a high level of performance while reducing complexity from the final set of candidate main synchronization sequences.

13. The system of claim 12, wherein, the extending step of the process further comprises:

extending a standard Zadoff-Chu sequence in length $N_{zc}$ into a generalized Zadoff-Chu sequence by sub-carrier mapping, to obtain a set of generalized Zadoff-Chu sequences $A=\{x_u|u=1, 2, \ldots, N_{zc}\}$, where, $x_u$ is the vector form of generalized Zadoff-Chu sequence $x_u(m)$, and u represents root index and m is the position of each root Zadoff-Chu sequence with m being greater than 0 and less than $N_{zc}$; and removing the middle point from each sequence in the set of generalized Zadoff-Chu sequences A, to obtain an set of initial candidate main synchronization sequences $B=\{d_u|u=1, 2, \ldots, N_{zc}\}$, where, $d_u$ is the vector form of initial candidate main synchronization sequence $d_u(k)$, and the length of vector $d_u$ is $N_{zc}-1$.

14. The system of claim 13, wherein, the generalized Zadoff-Chu sequence $x_u(m)$ is obtained from the following expression:

$$x_u(m) = \exp\left(-\frac{j\pi u m(m+1)}{N_{zc}}\right) m = 0, 1, \ldots, N_{zc}-1$$

where, j is imaginary unit;

$$d_u(k) = \begin{cases} \exp\left(-\frac{j\pi u k(k+1)}{N_{zc}}\right) & k = 0, 1, \ldots, \frac{N_{zc}-3}{2} \\ \exp\left(-\frac{j\pi u (k+1)(k+2)}{N_{zc}}\right) & k = \frac{N_{zc}-1}{2}, \frac{N_{zc}+1}{2}, \ldots, N_{zc}-2 \end{cases}.$$

15. The system of claim 14, wherein, the selection criteria are selected from one or more of: time domain autocorrelation characteristic, peak-to-average ratio of time domain signal, frequency offset susceptibility, time domain cross-correlation characteristic, and computing complexity in the correlation computation of main synchronization sequences on the receiving terminal.

16. The system of claim 15 wherein, the process further comprises:

computing the time domain autocorrelation characteristic of the sequences in the set of initial candidate main synchronization sequences:

$$P_u = 10\log_{10}\left(\frac{\max_{\substack{1-N\leq \tilde{n}\leq N-1 \\ \tilde{n}\neq 0}}\{R_u(\tilde{n})\}}{R_u(0)}\right) \text{ (dB)}$$

where, $$R_u(\tilde{n}) = \left|\sum_{n=0}^{N-1}s_u(n)s_u^*((n+\tilde{n})\bmod N)\right|,$$

$P_u$ being used to describe the time domain autocorrelation characteristic of a sequence, $R_u(\tilde{n})$ being the time domain autocorrelation value of a sequence, * representing conjugation, $\tilde{n}$ being the cyclic shift offset of sequence $s_u(n)$, and $1-N\leq \tilde{n}\leq N-1$; and setting a threshold for the time domain autocorrelation characteristic, and removing the sequences with computed time domain autocorrelation characteristic $P_u$ greater than the threshold, to obtain a first set of candidate main synchronization sequences.

17. The system of claim 16, wherein, the process further comprises:

computing the peak-to-average ratio of time domain signal of the sequences in the first set of candidate main synchronization sequences:

$$PAPR\{s_u\} = 10\log_{10}\left(\frac{\max_{0\leq n\leq N-1}\{|s_u(n)|^2\}}{E\{|s_u(n)|^2\}}\right) \text{ (dB)}$$

where, $PAPR\{s_u\}$ is used to describe the peak-to-average ratio of time domain signal of a sequence, $s_u$ is the vector form of time domain sequence $s_u(n)$, $E\{\cdot\}$ represents statistical average, max $\{\cdot\}$ represents selecting the maximum value; and setting a threshold for the peak-to-average ratio of time domain signal, and removing the sequences with computed peak-to-average ratio of time domain signal $PAPR\{s_u\}$ greater than the threshold, to obtain a second set of candidate main synchronization sequences.

18. The process of claim 17, wherein, the process further comprises:

computing the frequency offset susceptibility of the sequences in the second set of candidate main synchronization sequences:

$$FoS\{s_u\} = 10\log_{10}\left(\frac{\max_{\substack{1-N\leq d\leq N-1 \\ \tilde{n}\neq 0}}\{\tilde{R}_u(\tilde{n})\}}{\tilde{R}_u(0)}\right) \text{ (dB)}$$

where, $$\tilde{R}_u(\tilde{n}) = \left|\sum_{n=0}^{N-1}s_u(n)s_u^*((n+\tilde{n})\bmod N)\exp\left(\frac{j2\pi n\varepsilon}{N}\right)\right|,$$

$FoS\{s_u\}$ is used to describe the frequency offset susceptibility of a sequence, $\tilde{R}_u(\tilde{n})$ is the time domain autocorrelation value of a sequence after adding a carrier frequency offset, and $\varepsilon$ is a normalized carrier frequency offset; and setting a threshold for the frequency offset susceptibility, and removing the sequences with computed frequency offset susceptibility $FoS\{s_u\}$ greater than the threshold, to obtain a third set of candidate main synchronization sequences.

* * * * *